US010162851B2

(12) United States Patent
Eidson et al.

(10) Patent No.: US 10,162,851 B2
(45) Date of Patent: *Dec. 25, 2018

(54) METHODS AND SYSTEMS FOR PERFORMING CROSS STORE JOINS IN A MULTI-TENANT STORE

(75) Inventors: Bill C. Eidson, Palo Alto, CA (US); Craig Weissman, San Francisco, CA (US); Kevin Oliver, San Francisco, CA (US); James Taylor, San Francisco, CA (US); Simon Z. Fell, Corte Madera, CA (US); Donovan A. Schneider, San Francisco, CA (US)

(73) Assignee: salesforce.com, inc.

( * ) Notice: Subject to any disclaimer, the term of this patent is extended or adjusted under 35 U.S.C. 154(b) by 526 days.

This patent is subject to a terminal disclaimer.

(21) Appl. No.: 12/973,668

(22) Filed: Dec. 20, 2010

(65) Prior Publication Data
US 2011/0258178 A1    Oct. 20, 2011

Related U.S. Application Data

(60) Provisional application No. 61/325,709, filed on Apr. 19, 2010, provisional application No. 61/325,951, filed on Apr. 20, 2010.

(51) Int. Cl.
G06F 17/30    (2006.01)
(52) U.S. Cl.
CPC .. *G06F 17/30389* (2013.01); *G06F 17/30477* (2013.01)
(58) Field of Classification Search
CPC ............... G06F 17/30389; G06F 17/30477
(Continued)

(56) References Cited

U.S. PATENT DOCUMENTS 5,091,852 A   2/1992  Tsuchida et al.
5,379,419 A * 1/1995  Heffernan ......... G06F 17/30569
(Continued)

FOREIGN PATENT DOCUMENTS

CN    101430688    5/2009
JP    2001051879   2/2001
WO    WO-2010091191 8/2010

OTHER PUBLICATIONS

International Search Report and Written Opinion for Application No. PCT/US2011/032781 dated Nov. 28, 2011, 10 pages.
(Continued)

*Primary Examiner* — Mark D Featherstone
*Assistant Examiner* — Navneet Gmahl
(74) *Attorney, Agent, or Firm* — Elliott, Ostrander & Preston, P.C.

(57) ABSTRACT

Methods and systems for performing cross store joins in a multi-tenant store are described. In one embodiment, such a method includes retrieving data from a multi-tenant database system having a relational data store and a non-relational data store, receiving a request specifying data to be retrieved from the multi-tenant database system, retrieving, based on the request, one or more locations of the data to be retrieved, generating a database query based on the request, in which the database query specifies a plurality of data elements to be retrieved, the plurality of data elements including one or more data elements residing within the non-relational data store and one or more other data elements residing within the relational data store, and executing the database query against the multi-tenant database system to retrieve the data.

23 Claims, 7 Drawing Sheets

(58) Field of Classification Search
USPC .................................................. 707/712–715
See application file for complete search history.

(56) References Cited

U.S. PATENT DOCUMENTS

| | | | |
|---|---|---|---|
| 5,412,804 A * | 5/1995 | Krishna | G06F 17/30466 |
| 5,577,188 A | 11/1996 | Zhu | |
| 5,584,024 A | 12/1996 | Shwartz | |
| 5,598,559 A | 1/1997 | Chaudhuri | |
| 5,608,872 A | 3/1997 | Schwartz et al. | |
| 5,608,904 A | 3/1997 | Chaudhuri et al. | |
| 5,649,104 A | 7/1997 | Carleton et al. | |
| 5,668,987 A | 9/1997 | Schneider | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,819,251 A * | 10/1998 | Kremer | G06F 17/30595 |
| 5,821,937 A | 10/1998 | Tonelli et al. | |
| 5,831,610 A | 11/1998 | Tonelli et al. | |
| 5,864,842 A | 1/1999 | Pederson et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,006,234 A | 12/1999 | Govindarajan et al. | |
| 6,029,163 A | 2/2000 | Ziauddin | |
| 6,061,676 A | 5/2000 | Srivastava et al. | |
| 6,092,061 A | 7/2000 | Choy | |
| 6,092,083 A | 7/2000 | Brodersen et al. | |
| 6,169,534 B1 | 1/2001 | Raffel et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,178,425 B1 | 6/2001 | Brodersen et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| 6,341,281 B1 | 1/2002 | MacNicol et al. | |
| D454,139 S | 3/2002 | Feldcamp | |
| 6,360,214 B1 | 3/2002 | Ellis et al. | |
| 6,367,077 B1 | 4/2002 | Brodersen et al. | |
| 6,370,524 B1 | 4/2002 | Witkowski | |
| 6,385,603 B1 | 5/2002 | Chen et al. | |
| 6,393,605 B1 | 5/2002 | Loomans | |
| 6,405,220 B1 | 6/2002 | Brodersen et al. | |
| 6,411,951 B1 | 6/2002 | Galindo-Legaria et al. | |
| 6,434,550 B1 | 8/2002 | Warner et al. | |
| 6,446,089 B1 | 9/2002 | Brodersen et al. | |
| 6,453,314 B1 * | 9/2002 | Chan | G06F 17/30371 |
| 6,457,003 B1 * | 9/2002 | Gajda | G06F 17/30557 |
| 6,477,534 B1 | 11/2002 | Acharya et al. | |
| 6,535,909 B1 | 3/2003 | Rust | |
| 6,549,908 B1 | 4/2003 | Loomans | |
| 6,553,371 B2 | 4/2003 | Gutierrez-Rivas et al. | |
| 6,553,563 B2 | 4/2003 | Ambrose et al. | |
| 6,560,461 B1 | 5/2003 | Fomukong et al. | |
| 6,567,802 B1 | 5/2003 | Popa et al. | |
| 6,574,635 B2 | 6/2003 | Stauber et al. | |
| 6,574,639 B2 | 6/2003 | Carey et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,563 B1 | 3/2004 | Koskas | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,938,052 B2 * | 8/2005 | Mild | G06F 17/3056 |
| 6,983,275 B2 | 6/2006 | Koo et al. | |
| 7,177,862 B2 * | 2/2007 | Zhang | G06F 17/30864 707/722 |
| 7,461,077 B1 | 2/2008 | Greenwood | |
| 7,340,411 B2 | 3/2008 | Cook | |
| 7,343,367 B2 | 3/2008 | Muras et al. | |
| 7,487,140 B2 | 2/2009 | Chen et al. | |
| 7,529,728 B2 | 5/2009 | Weissman et al. | |
| 7,590,620 B1 * | 9/2009 | Pike | G06F 11/1482 |
| 7,620,655 B2 | 11/2009 | Larsson et al. | |
| 7,653,652 B2 | 1/2010 | Kagalwala et al. | |
| 7,779,039 B2 | 8/2010 | Weissman | |
| 7,962,448 B2 | 6/2011 | Creamer et al. | |
| 8,275,763 B2 | 9/2012 | Weissman et al. | |
| 8,280,875 B2 | 10/2012 | Weissman et al. | |
| 8,335,781 B2 | 12/2012 | Weissman et al. | |
| 8,402,028 B2 | 3/2013 | Weissman | |
| 8,447,754 B2 | 5/2013 | Weissman et al. | |
| 8,898,145 B2 | 11/2014 | Wang et al. | |
| 2001/0044791 A1 | 11/2001 | Richter et al. | |
| 2001/0047372 A1 * | 11/2001 | Gorelik | G06F 17/30604 715/239 |
| 2001/0056428 A1 | 12/2001 | Gajda et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0107840 A1 * | 8/2002 | Rishe | G06F 17/30392 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2002/0194167 A1 * | 12/2002 | Bakalash | C03B 37/02718 |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0055830 A1 | 3/2003 | Gutierrez-Rivas et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0093415 A1 | 5/2003 | Larson et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0208461 A1 | 11/2003 | Messinger et al. | |

(56) References Cited

U.S. PATENT DOCUMENTS

| | | |
|---|---|---|
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0243799 A1 | 12/2004 | Hacigumus et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0049992 A1 | 3/2005 | Gupta |
| 2005/0050555 A1 | 3/2005 | Exley et al. |
| 2005/0065911 A1 | 3/2005 | Ellis et al. |
| 2005/0091098 A1 | 4/2005 | Brodersen et al. |
| 2005/0223022 A1* | 10/2005 | Weissman ......... G06F 17/30595 |
| 2007/0124276 A1 | 5/2007 | Weissman et al. |
| 2007/0130137 A1* | 6/2007 | Oliver ............... G06F 17/30286 |
| 2007/0192295 A1* | 8/2007 | Bakalash ........... C03B 37/02718 |
| 2007/0214104 A1 | 9/2007 | Miao et al. |
| 2008/0033914 A1* | 2/2008 | Cherniack ......... G06F 17/30457 |
| 2008/0189239 A1 | 8/2008 | Bawa et al. |
| 2009/0077054 A1 | 3/2009 | Muras et al. |
| 2009/0164447 A1 | 6/2009 | Daya |
| 2009/0222404 A1* | 9/2009 | Dolin ................ G06F 17/30427 |
| 2009/0276395 A1 | 11/2009 | Weissman et al. |
| 2009/0282045 A1* | 11/2009 | Hsieh .................. G06F 21/6218 |
| 2010/0005077 A1 | 1/2010 | Krishnamurthy et al. |
| 2010/0211619 A1* | 8/2010 | Weissman ......... G06F 17/30442 707/812 |
| 2011/0196827 A1 | 8/2011 | Zunger |
| 2011/0258179 A1 | 10/2011 | Weissman et al. |
| 2012/0317096 A1 | 12/2012 | Kaufmann et al. |

OTHER PUBLICATIONS

International Preliminary Report on Patentability for Application No. PCT/US2011/032781 dated Oct. 16, 2012, 9 pages.
International Search Report and Written Opinion for Application No. PCT/US11/32631 dated Dec. 1, 2011, 7 pages.
Office Action for U.S. Appl. No. 12/973,676 dated Jul. 24, 2012, 24 pages.
"Join sequence optimization in Parallel Query Plans," by Langer et al. IEEE 1996, 8 pages.
"Join Optimization of Information Extraction Output: Quality Matters!," by Jain et al. 2009 IEEE, 12 pages.
"Semantic information-based alternative plan generation for multiple query optimization," by Faruk Polat et al. Information Science 137 dated 2001, 31 pages.
Notice of Allowance for U.S. Appl. No. 12/973,676 dated Jan. 29, 2013, 24 pages.
International Preliminary Report on Patentability for Application No. PCT/US11/32631 dated Jun. 25, 2013, 8 pages.
Office Action for Application No. 2013-546104 dated Jul. 23, 2014, 9 pages.
"Real image of a foundation disclosed by a designer who analyzes the latest cloud technology," Nikkei Computer, Japan, Nikkei BP Inc. Sep. 1, 2010, No. 764, 9 pages.
"Design theory of cloud," Masayoshi Hagiwara, Nikkei Systems, Japan, Nikkei BP Inc. Nov. 26, 2010, No. 212, 10 pages.
Office Action for U.S. Appl. No. 13/868,746 dated Jul. 28, 2014, 18 pages.
Final Office Action for U.S. Appl. No. 13/868,746 dated Dec. 29, 2014, 28 pages.
"Implementation of NOSQL for Robotics," by Vijaykumar et al. 2010 IEEE, 6 pages.
First Office Action for Chinese Patent Application No. 201180061441.7 dated May 5, 2015, 24 pages.
Office Action for U.S. Appl. No. 13/868,746 dated Jun. 23, 2015, 32 pages.
Uma Bhat et al. "Moving Towards Non-Relational Databases", 2010 International Journal of computer Applications, vol. 1, No. 13, pp. 40-46, 7 pages.
Final Office Action for U.S. Appl. No. 13/868,746 dated Oct. 16, 2015, 33 pages.
Extended European Search Report for European Patent Application No. 11850646.8 dated Jul. 2, 2015, 8 pages.
Notice of Allowance for Chinese Patent Application No. 201180061441.7, dated Feb. 4, 2016, 2 pages.
Non-Final Office Action for U.S. Appl. No. 13/868,746, dated Apr. 12, 2016, 27 pages.
Office Action for Japanese Patent Application No. 2015-042121, dated Mar. 29, 2016, 3 pages.
Exam Report for Australian Patent Application No. 2011345318, dated Jun. 3, 2016, 3 pages.

\* cited by examiner

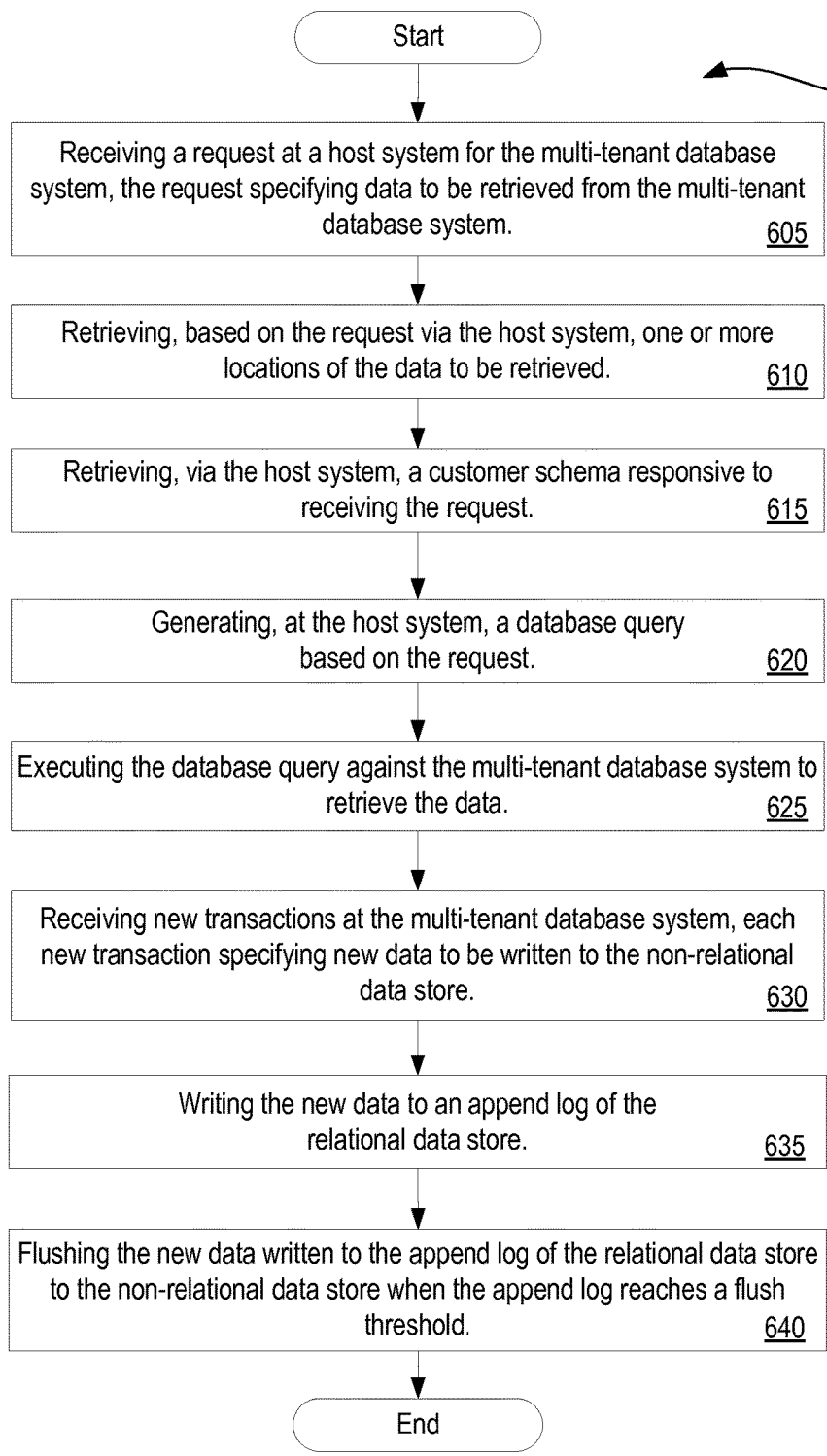

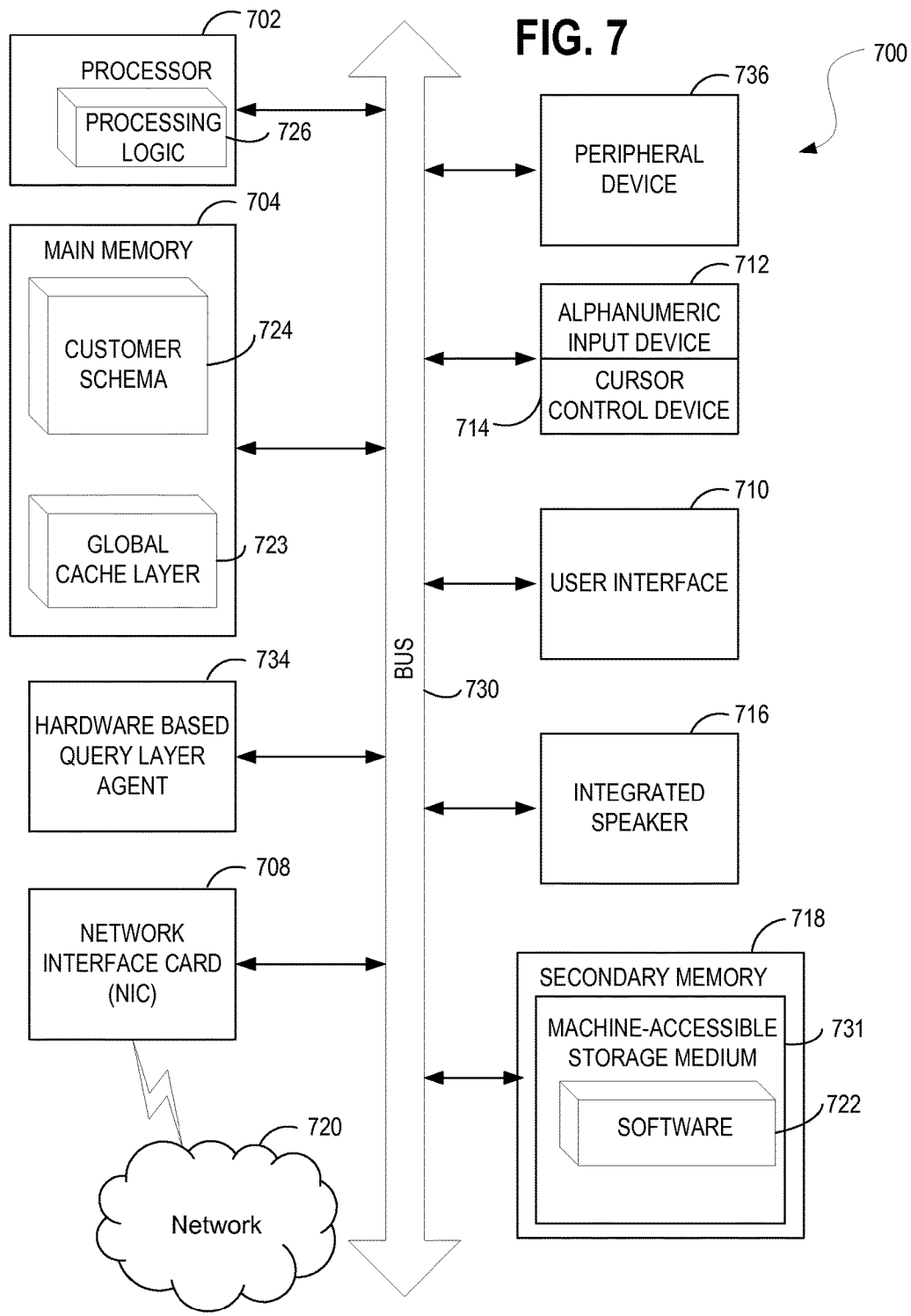

METHODS AND SYSTEMS FOR PERFORMING CROSS STORE JOINS IN A MULTI-TENANT STORE

CLAIM OF PRIORITY

This application is related to, and claims priority to, the provisional utility application entitled "METHODS AND SYSTEMS FOR PERFORMING CROSS STORE JOINS IN A MULTI-TENANT STORE," filed on Apr. 19, 2010, having an application number of 61/325,709, the entire contents of which are incorporated herein by reference; and this application is further related to, and claims priority to, the provisional utility application entitled "METHODS AND SYSTEMS FOR OPTIMIZING QUERIES IN A MULTI-TENANT STORE," filed on Apr. 20, 2010, having an application number of 61/325,951, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to methods and systems for performing cross store joins in a multi-tenant store.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Within a computing environment, various data storage environments may be selected for persistently storing data. For example, data may be stored within file systems managed by an operating system that persistently stores file system data upon a hard drive, or data may be persistently stored within a database. Various types of databases are available, each having its own particular benefits and drawbacks. For example, so called relational databases provide the ability to "relate" various data tables to each other within the database, using common characteristics shared by each table. For example, in a relational database, an employee identifier may be used as a common characteristic to relate more than one table. Such a database structure has certain drawbacks, however, one of which is that the relationships necessitate a high level of computational overhead costs and computational complexity which limits the extent to which a relational database can be scaled.

Non-relational database models and implementations also exist and commonly exhibit better scalability, but also exhibit different drawbacks that are not associated with relational database models and implementations. For example, non-relational database implementations often exhibit improved scalability for storing large files or objects, but may be less suitable in other regards such as sorting selective datasets or implementing data guarantees for fast changing datasets.

Unfortunately, database queries that simultaneously reference information from multiple data stores are highly inefficient and detract from benefits that may otherwise be derived from the implementation of multiple data stores. Moreover, database queries that simultaneously reference distinct implementations of diverse database models may be wholly impracticable using previous database query mechanisms.

BRIEF DESCRIPTION OF THE DRAWINGS

Embodiments are illustrated by way of example, and not by way of limitation, and can be more fully understood with reference to the following detailed description when considered in connection with the figures in which:

FIG. 6 is a flow diagram illustrating a method for performing cross store joins in a multi-tenant store in accordance with one embodiment; and FIG. 7 illustrates a diagrammatic representation of a machine in the exemplary form of a computer system, in accordance with one embodiment.

DETAILED DESCRIPTION

Figure 1:
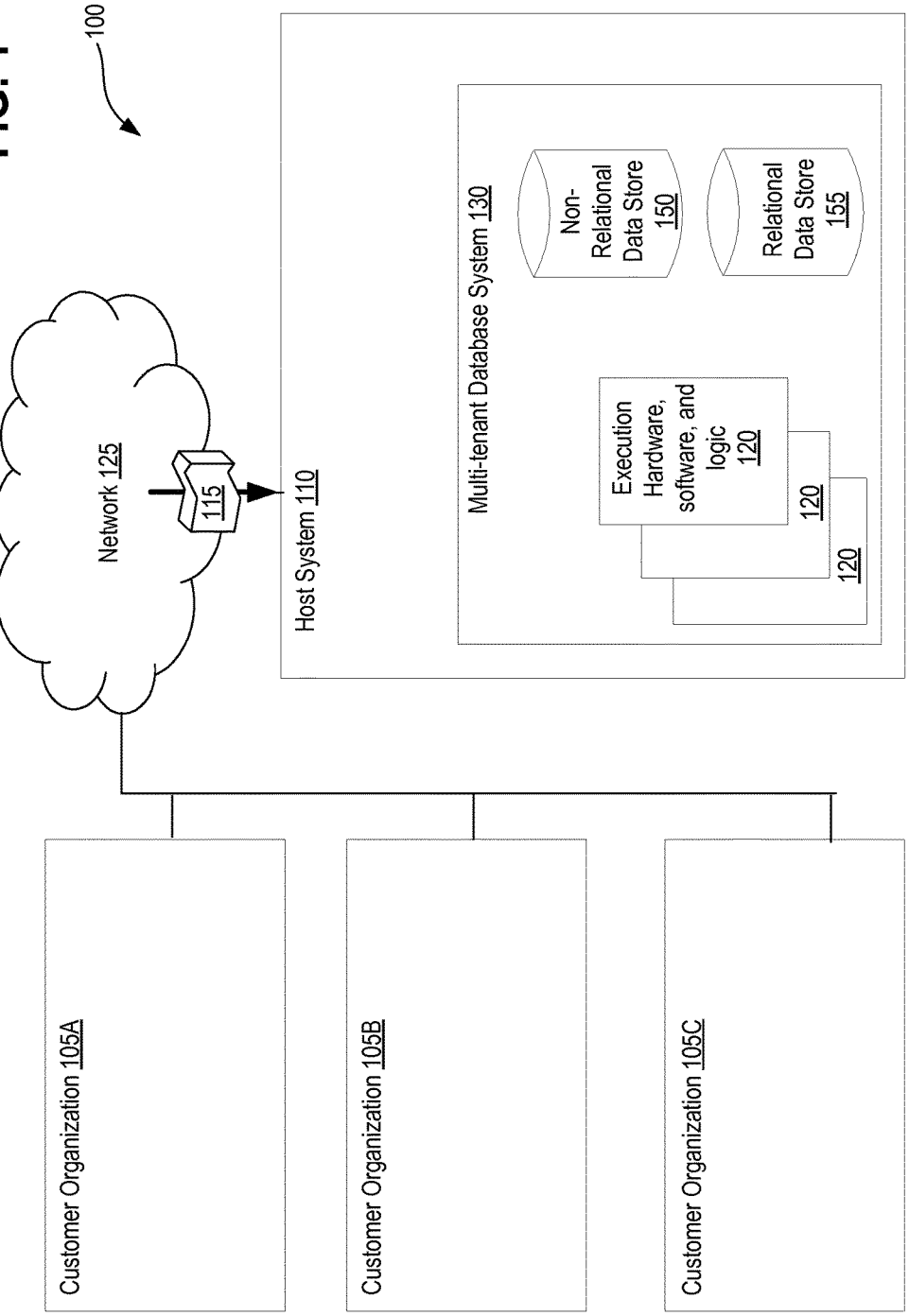
FIG. 1 illustrates an exemplary architecture in which embodiments may operate.

Described herein are systems, devices, and methods for performing cross store joins in a multi-tenant store. In one embodiment, such a method includes retrieving data from a multi-tenant database system having a relational data store and a non-relational data store. For example, in such a method, a host system for the multi-tenant database system receives a request specifying data to be retrieved from the multi-tenant database system, retrieving, based on the request via the host system, one or more locations of the data to be retrieved, generating, at the host system, a database query based on the request, in which the database query specifies a plurality of data elements to be retrieved, the plurality of data elements including one or more data elements residing within the non-relational data store and one or more other data elements residing within the relational data store, and executing the database query against the multi-tenant database system to retrieve the data.

A federated query, which is a query that searches or references more than one database may be highly inefficient, especially when referencing data at the lowest row-level of a database, such as by requesting a join operation between tables stored in different data stores, because the operation consumes so much network bandwidth that such join operations do not scale well and thus, cannot feasibly be implemented on larger database implementations. Challenges with such join operations are further exacerbated when requesting data joins between database implementations operating on diverse models, such as a join between, for example, a relational database implementation and a non-relational database implementation. The methodologies described herein facilitate the ability to perform such join operations in a manner that can be feasibly implemented on larger database systems and in particular, that can feasibly be implemented on systems that leverage multiple data store implementations that operate on diverse operational models, such as relational and non-relational models.

For example, using the methodologies described herein, a join operation may be performed by initiating non-relational database queries on non-relational database stored objects where one or more foreign key parents is an object stored in a relational type database implementation, such as Oracle™. For instance, a child table stored in non-relational database may have an "Account" table stored in Oracle™ as its master table, despite the non-relational database stored objects being persisted in a non-relational database implementation and the Oracle™ stored object being persisted in a relational database implementation.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a computer readable storage medium having instructions stored thereon, causes one or more processors within a multi-tenant database environment to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Architecture 100 depicts a host system 110 communicably interfaced with several customer organizations (105A, 105B, and 105C) via network 125. Within host system 110 is a multi-tenant database system 130 having a plurality of underlying hardware, software, and logic elements 120 therein that implement database functionality and a code execution environment within the host system 110 and in which the hardware, software, and logic elements 120 of the multi-tenant database system 130 are separate and distinct from a plurality of customer organizations (105A, 105B, and 105C) which utilize the services provided by the host system 110 by communicably interfacing to the host system 110 via network 125. In such an embodiment, each of the separate and distinct customer organizations (105A-105C) may be remotely located from the host organization that provides services to the customer organizations (105A-105C) via host system 110 having the multi-tenant database system 130 executing therein. Alternatively, one or more of the customer organizations 105A-105C may be co-located with the host system 110, such as within a same host organization that provides the multi-tenant database system 130 upon which underlying data is persistently stored.

In one embodiment, the hardware, software, and logic elements 120 of the multi-tenant database system 130 include at least a non-relational data store 150 and a relational data store 155, which operate in accordance with the hardware, software, and logic elements 120 that implement the database functionality and code execution environment within the host system 110. Host system 110 may further receive requests 115 from one or more of the plurality of customer organizations 105A-105C via the network. For example, an incoming request 115 may correspond to a request for services or a request to retrieve or store data on behalf of one of the customer organizations 105A-C within the multi-tenant database system 130.

Figure 2:
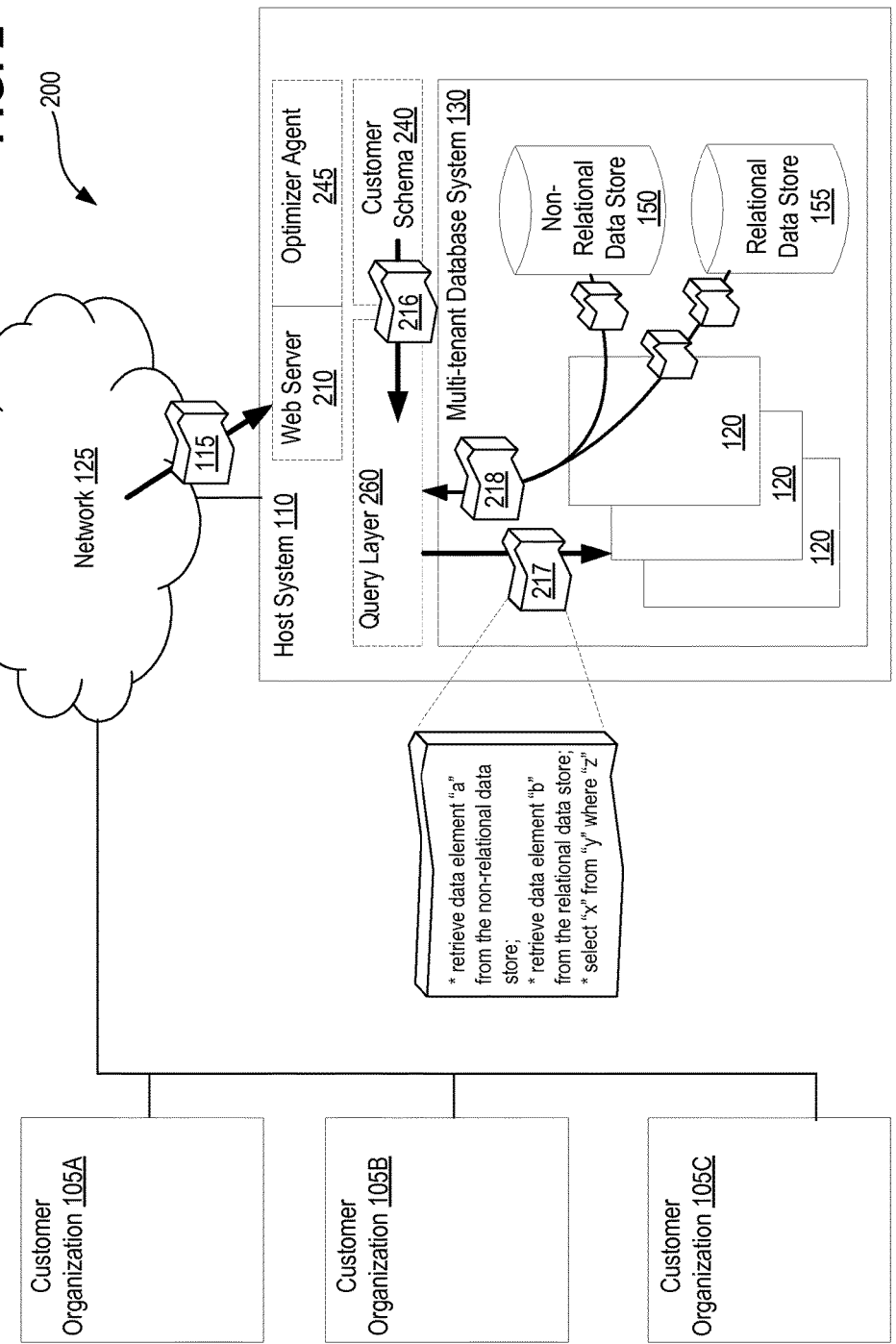
FIG. 2 illustrates an alternative exemplary architecture in which embodiments may operate.

FIG. 2 illustrates an alternative exemplary architecture 200 in which embodiments may operate. In one embodiment, host system 110 implements a method of retrieving data from a multi-tenant database system 130 having a relational data store 155 and a non-relational data store 150.

For example, in such an embodiment, a request 115 is received at a host system 110 for the multi-tenant database system 130, with the request 115 specifying data 218 to be retrieved from the multi-tenant database system 130. In some embodiments, a distinct web-server 210 operating within the host system 110 receives the incoming request 115 via network 125. For example, web server 210 may be responsible for receiving requests 115 from various customer organizations 105A-C via network 125. Web server 210 may provide a web-based interface to a end-user client machine originating the request 115 (e.g., such as an end-user client device located within a customer organization 105A-C), the request 115 constituting a request for services from the multi-tenant database system 130 operating within a host organization such as host system 110 that provides, for example, remotely implemented cloud computing services. Optimizer agent 245 may also provide additional functions such as developing pre-queries and optimizing data queries in accordance with certain embodiments.

In one embodiment, the host system 110 retrieves, based on the request 115, one or more locations 216 of the data 218 to be retrieved. In one embodiment, a customer schema 240 describes the one or more locations 216 of data 218 to be retrieved, in which the customer schema 240 specifies each of the plurality of data elements of the data 218 to be retrieved as residing within either the non-relational data store 150 or residing within the relational data store 155, or as being available from both the non-relational data store 150 and the relational data store 155. In one embodiment, the host system 110 retrieves the customer schema 240 responsive to receiving the request 115. Alternatively, the host system 110 retrieves the one or more locations 216 of the data 218 to be retrieved from the customer schema 240.

For example, in a particular embodiment, the one or more locations 216 of the data 218 to be retrieved are stored in and retrieved from a customer schema 240 that specifies where each of a plurality of data elements that constitute the data 218 to be retrieved are located within the multi-tenant database system 130. Such a customer schema 240 may be accessible via, for example, a global caching layer that provides fast efficient access to various elements of a host system 110 implementing or providing the described multi-tenant storage capabilities. In alternative embodiments, the one or more locations 216 of data 218 to be retrieved may be retrieved from the customer schema 240 by the host system 110, by the optimizer agent 245, by a query layer 260 of the host system 110, or by other elements of the host system 110 responsible for determining the locations 216 of data 218 to be retrieved from the multi-tenant database system 130 that is spread across diverse database implementations, such as data 218 having a plurality of data elements that is spread across the non-relational data store 150 and the relational data store 155 as depicted.

In one embodiment, the host system 110 generates a database query 217 based on the request 115, in which the database query 217 specifies a plurality of data elements to be retrieved, the plurality of data elements including one or more data elements residing within the non-relational data store 150 and one or more other data elements residing within the relational data store 155. In a particular embodiment, the database query 217 is based further on the retrieved one or more locations 216 of the data 218 to be retrieved. Such a database query 217 may further be generated or delegated by the host system 110 for generation by a sub-system of the host system 110, such as query layer 260 or optimizer agent 245.

In one embodiment, host system 110 executes the generated database query 217 against the multi-tenant database system 130 to retrieve the data 218, such as that which is depicted by FIG. 2, with the downward facing arrow directed toward the plurality of underlying hardware, software, and logic elements 120 of the multi-tenant database system 130 depicting the database query 217 being passed to the implementing functionality of the multi-tenant database system 130 and data 218 responsively being returned by the multi-tenant database system 130 which is depicted by the upward curved arrows sending a plurality of data elements originating from each of the diverse data stores, the non-relational data store 150 and the relational data store 155, back to the host system 110.

In one embodiment, the database query 217 includes a plurality of sub-queries. In such an embodiment, at least one of the plurality of sub-queries are directed toward retrieving the one or more data elements residing within the non-relational data store 150 from the non-relational data store 150 and at least a second one of the plurality of sub-queries are directed toward retrieving the one or more other data elements residing within the relational data store 155 from the relational data store 155. For example, depicted by FIG. 2 within the expanded view of database query 217 are several sub-query strings such as "retrieve data element 'a' from the non-relational data store" (e.g., 150) and "retrieve data element 'b' from the relational data store" (e.g., 155) and another sub-query string which states "select 'x' from 'y' where 'z'" reflective of a generic Structured Query Language (SQL) type query. Such a query may or may not be appropriate for querying the underlying data stores (e.g., 150 and 155) depending upon the implementing query language or syntax chosen.

Thus, in accordance with such embodiments, executing the database query 217 against the multi-tenant database system 130 includes referencing data elements stored in both the relational data store 155 and the non-relational data store 150 so as to retrieve the requisite data 218.

Figure 3:
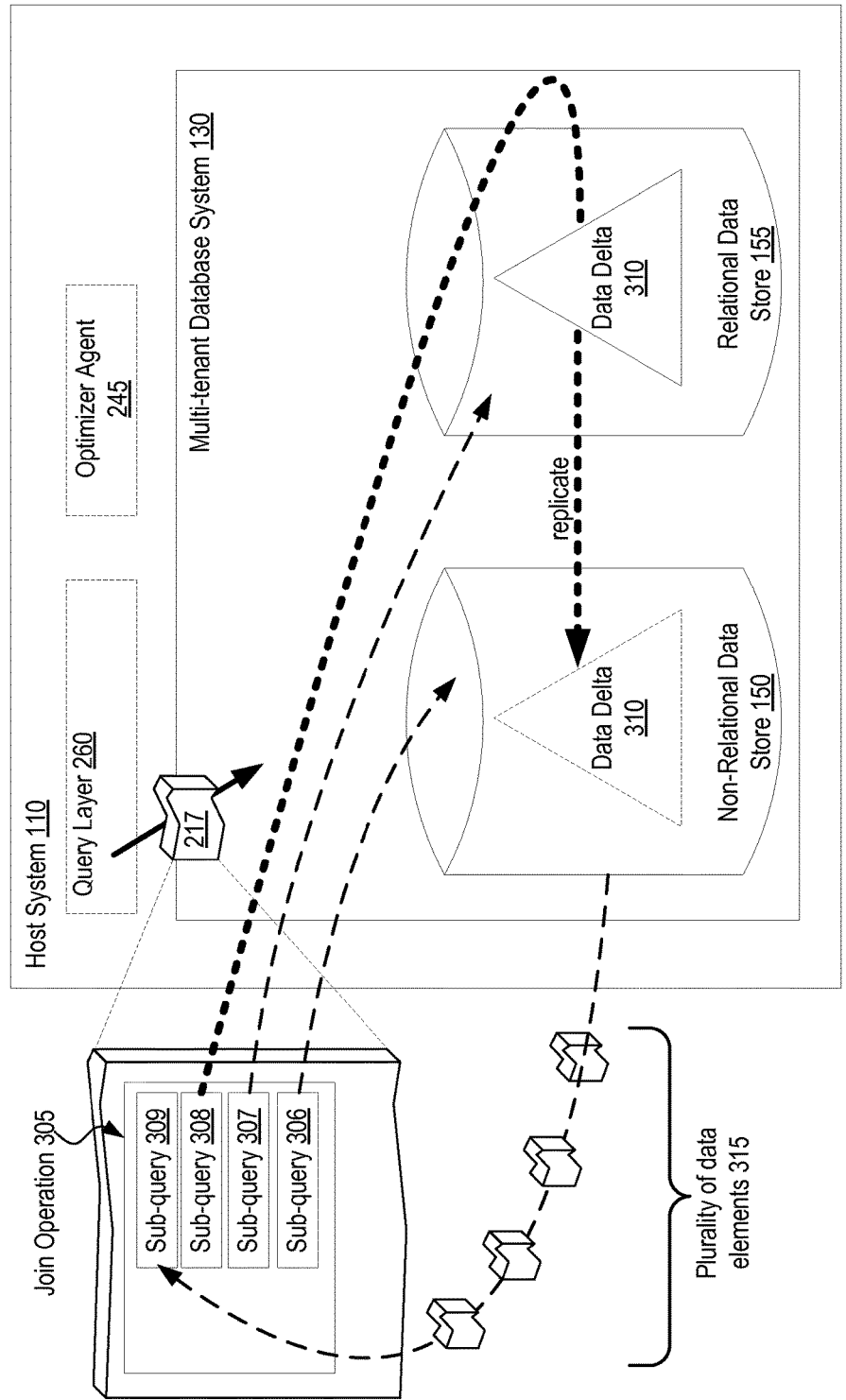
FIG. 3 illustrates an alternative exemplary architecture in which embodiments may operate.

FIG. 3 illustrates an alternative exemplary architecture 300 in which embodiments may operate. In particular, depicted in additional detail are join operations specified by the database query 217 in accordance with certain embodiments.

For example, in accordance with one embodiment, a join operation 305 is specified by the database query 217.

In a particular embodiment, the join operation 305 includes multiple sub-queries. For example, in such an embodiment a first sub-query 306 is to be executed against the non-relational data store 150 and identifies the one or more data elements residing within the non-relational data store 150; depicted by the dashed curved arrow pointing to non-relational data store 150.

In such an embodiment, a second sub-query 307 is to be executed against the relational data store 155 and determines a data delta 310 between the first sub-query 306 that identifies the one or more data elements residing within the non-relational data store 150 and the one or more other data elements residing within the relational data store 155.

In this embodiment, a third sub-query 308 is to be executed against the relational data store 155 and the non-relational data store 150, wherein the third sub-query 308 replicates data corresponding to the determined data delta 310 from the relational data 155 store to the non-relational data store 150. For example, such a third sub-query 308 may retrieve the one or more other data elements residing within the relational data store 155, pulling them into, for example, a temporary table, file, temporarily caching the data, etc., and then such a third sub-query 308 may issue an insertion or write command of the retrieved data corresponding to the data delta 310 against the non-relational data store 150, causing the data delta 310 data to be written, stored, or inserted into the non-relational data store 150, thus completing the replication and thus further causing the previously unavailable data elements which resided in the relational data store 155 to now be available from the non-relational data store 150. Refer to the dashed line of FIG. 3 depicting a third sub-query 308 being executed against both data stores (relational data store 155 and non-relational data store 150) to replicate the identified data delta 310 from the relational data store 155 to the non-relational data store 150.

The determination to replicate or synchronize data from one data store to another data store may be based on various considerations. For example, the decision to replicate from the relational data store 155 to the non-relational data store 150 may be based upon a determination or a policy to replicate a smaller dataset from its primary location to the location having the larger dataset. For example, replicating the one or more data elements that are part of the requested data may be more efficient from a network bandwidth perspective to conduct the replication from the relational data store 155 to the non-relational data store 150, than vise-versa.

In some embodiments, the opposite may equally be true, and thus, the replication of data may go in the other direction, from the non-relational data store 150 to the relational data store 155. Such determinations may be conducted by or made by, for example, optimizer agent 245. In a particular embodiment using a non-relational database implementation (e.g., 150), relational database type objects stored in a relational data store 155 (e.g., Oracle™) and are replicated to a non-relational data store 150 via one sub-query specifying a join operation 305, and then another sub-query specifying a data retrieval operation may pull all of the requisite data from the non-relational data store 150, as the replication causes all of the required data to be made available from the non-relational data store 150, notwithstanding that, in such an example, at least some of the data is persistently stored and initially available only from the relational data store 155 (e.g., Oracle™).

Other replication decisions and considerations may similarly be considered and implemented by optimizer agent 245. For example, one replication policy may be based on consistency guarantees the replication operation affords, such as, whether or not the replicated data is always in sync or guaranteed to be in sync, or whether some deviance is an acceptable risk.

Take for example a replication operation that requires the replication of 10 million "Account" tables from the relational data store 155 to the non-relational data store 150 so that one billion child rows can be queried from the non-relational data store 150. With such an example, a non-relational database query engine may be utilized to make a bulk callout via JDBC (Java Database Connectivity) to retrieve the Oracle™ (e.g., relational) data. In such an example, an Oracle™ RAC (Oracle Real Application Cluster) may be utilized or an Oracle™ 11g data guard based guarantee mechanism may be utilized to provided the necessary consistency, where consistency guarantees are an important consideration and very large data replications are being initiated. Such large replications may be most appropriately performed in advance, as doing so at query time, responsive on-the-fly to an incoming request for data may require an unacceptably long delay in responding to or fulfilling the incoming request.

Conversely, take an example with small tables and correspondingly small data transfers. In such an example, the entire contents of a small table or several small tables existing within a relational data store 155 (e.g., Oracle™) having current data may be replicated over to the non-relational data store 150 at query time, for example, responsive to an incoming request for data in which at least a portion of that data exists within the small tables and is persistently stored by the relational data store 155 (e.g., Oracle™). Such a policy may be appropriate for large analytics where the fixed cost of this type of query and replication is not significant, as determined by, for example, optimizer agent 245.

Another consideration may be on an OrgID by OrgID basis, depending on, for example, the size of tables or objects associated with each particular Organization. For example, a policy may be adopted that data corresponding to medium to large Organizations (e.g., based on a pre-determined size threshold) are replicated in advance. In one embodiment, advance replication may make use of skinny table replication code, which captures changes to specified objects within the relational data store 155 and pushes those changes to another table, such as a pre-replicated table (e.g., where advance replication is chosen) within a non-relational data store 150.

In certain embodiments, particular organizations may trigger high volumes of changes, and thus, real time synchronization may not necessarily be required or appropriate for every change, while still allowing the requested analysis to be performed on the non-relational data store 150. Thus, in such an embodiment, the option of synchronizing the updates at specific intervals is provided (for example, via optimizer agent 245 and the hardware based query layer agent 501 and 734 discussed below). In such an embodiment, a policy that allows updates at specific intervals provides for more efficient writes and updates, albeit with perhaps the consequence dangling references and other "sloppy data" which may be an acceptable deviance, or may required subsequent data checks and validation depending on the adopted replication policy or underlying objective of the database query.

Another consideration with respect to replication may be data store statistics, such as the cardinality of tables. Statistics may be produced, available through, or gathered by optimizer agent 245. For example, in certain embodiments where a relatively small set of rows are required, a sub-query (e.g., 306-309) may query the entire set of rows required from the relational data store 155 and send the entire set of queried rows to the non-relational data store 150, when it is determined that the overall database query 217 being processed is large and sending the entire set of queried rows constitutes a reasonable transmission cost (e.g., based on a predetermined size ratio or fixed threshold, etc.). Such a policy may avoid the need to pre-replicate or conduct advance replication without having yet received an actual request for data and may further avoid the above described data inconsistency concerns.

Considerations of where to persistently store data, and thus, from where to retrieve data from, may further be based upon the underlying implementing hardware of a particular data store. For example, non-relational data store 150 may be optimized for the storing of large flat files and binary files upon inexpensive storage in terms of, for example, cost per gigabyte. Such an underlying hardware implementation may be feasible because the non-relational data store (e.g., 150) is optimized for bulk reading of compressed flat files and binary files, and is thus, less expensive computationally to processes requests against per gigabyte in contrast to a relational model data store (e.g., 155) such as Oracle™. A relational data store 155 such as Oracle™ may require more expensive storage hardware on a per gigabyte basis due to requirements of the relational data store 155 to implement, for example, mandatory analytics for all stored data, Enterprise level data protections such as transaction processing and rollback capability. Such Enterprise level data protections further enable, through transaction processing, the ability to "redo" a particular transaction in the event of a failure in contrast to a direct insertion model that may feasibly leave a data store lacking transaction processing in an inconsistent state should a database transaction fail or be interrupted before final completion.

Thus, in certain embodiments, recent edits to stored data are transacted and stored by a relational data store 155 that implements analytics, transaction processing and rollbacks, and at least a portion of updates written to the relational data store 155 are subsequently replicated, moved, transacted, or migrated to a non-relational data store 150 so as to reduce the cost per gigabyte cost of persistently storing the corresponding data. In such a way, host system 110 may leverage Enterprise level data protections associated with certain relational data stores 155 and contemporaneously benefit from less costly persistent storage available via some non-relational data stores 150.

In one embodiment, because the optimizer agent 245 has a "view" of the available data from both the non-relational data store 150 and the relational data store 155, the optimizer agent 245 can yield "selective queries" when certain data elements corresponding to an incoming request 115 for data 218 may be obtained from more than one source and in more than one manner. Optimizer agent 245 can further yield an improved sequence or an ordering of a plurality of sub-queries to be issued in order to fulfill such a request 115.

Thus, in accordance with certain embodiments and in view of the various available considerations, a fourth sub-query 309 is further included within the join operation 305 and is to be executed against the non-relational data store 150, in which the fourth sub-query 309 fetches the data to be retrieved from the non-relational data store 150 by fetching both the one or more data elements residing within the non-relational data store 150 and the one or more other data elements replicated from the relational data store 155 to the non-relational data store 150 and thus available from within the non-relational data store 150. In such a way, the plurality of data elements 315 may be completely retrieved from one of the data stores, such as from the non-relational data store 150, despite some of the plurality of data elements 315 not initially being available from the non-relational data store 150 prior to data replication triggered by the join operation 305.

In some embodiments, alternative to replicating data between data stores where one or more data elements of the requested data is persistently stored, a policy may be adopted to retrieve all of the data elements into a location separate from each of the two or more data stores (e.g., 150 and 155) being queried that persistently store the data. For example, data may be retrieved utilizing an in-memory join operation into query layer 260 or retrieved via an in-memory join operation into a global caching layer (e.g., element 550 of FIG. 5). Such an in-memory join operation may be selected based on known statistics available from optimizer agent 245 or based on specified size thresholds (e.g., number of rows, amount of data in terms of size (e.g., megabytes of data), cardinality of data requested, etc.).

Other considerations that may available based upon, for example, known statistics and analysis within the host system 110 may include a query cost for a particular database query 217 or sub-query (e.g., 306-309), for example, derived from a known pick list quantity for a particular query in which a maximum number of elements is known, and thus, a maximum or estimated query cost is determinable or is known and available from the optimizer agent 245. It may further be known based on already conducted analysis or determinable via the optimizer agent 245 (e.g., through one or more pre-queries) which of multiple available data stores (e.g., 150 and 155) can yield a result having the smallest number of rows in the least amount of time or utilizing/consuming the fewest computational resources. For example, with large database queries 217, it may be advisable to conduct a pre-query for a small fraction of the requisite data from each data store (e.g., 150 and 155) to determine which pre-query results in a more efficient result, and then based on such a determination, generate the various sub-queries (306-309) required to fulfill the primary database query 217 targeting the more efficient data store (e.g., 150 or 155 depending on the result of the pre-query). Where appropriate analysis is conducted ahead of time by the optimizer agent 245, the query policy may simply be requested, without having to issue pre-queries, for example, such analytical determinations may be made and then stored and specified for one or more locations of data via customer schema 240.

In alternative embodiments, different or additional join operations 305 may be performed. For example, in one embodiment, a join operation 305 executed against the multi-tenant database system 130 via database query 217 may include a join operation 305 selected from a group of join operations 305 consisting of: a join operation 305 specifying two or more relation tables from the relational data store 155; a join operation 305 specifying at least one relation table from the relational data store 155 and at least one or more data structures residing within the non-relational data store 150; and a join operation 305 specifying two or more separate and distinct data structures residing within the non-relational data store 150, in which each of the two or more separate and distinct data structures lack an overlapping shared key, such as a shared characteristic, string, binary or alphanumeric key with which to associate or otherwise relate the two distinct data structures within the non-relational data store 150.

For example, in one embodiment, non-relational data store 150 provides the capability to store many data structures, files, objects and other such information, but does not implement functionality to "relate" such data structures, files, objects, and other information. A join operation 305 specifying each of the two distinct data structures can, however, identify and link or associate each such data structure, by depending on functionality and logic external to the implemented non-relational data store 150, such as the plurality of underlying hardware, software, and logic elements 120 within multi-tenant database 130 that can execute the appropriately formed join operation 305 against the non-relational data store 150 to form, for example, a singular data structure having all of the desired but previously unassociated information, or retrieving and temporarily caching the desired information specified by such a join operation in an alternate location.

In an alternative embodiment, a specified join operation 305 includes: a first sub-query (e.g., 306) to be executed against the non-relational data store 150, in which the first sub-query (e.g., 306) is to retrieve the one or more data elements residing within the non-relational data store 150; a second sub-query (e.g., 307) to be executed against the relational data store, 155 in which the second sub-query (e.g., 307) determines a data delta 310 between the one or more data elements residing within the non-relational data store 150 and the one or more other data elements residing within the relational data store 155; and a third sub-query (e.g., 308) that is to be executed against the relational data store 155, wherein the third sub-query (e.g., 308) is to retrieve the one or more other data elements residing within the relational data store 155 based on the determined data delta 310.

In such an embodiment, the third sub-query (e.g., 308) that retrieves the one or more other data elements residing within the relational data store 155 based on the determined data delta 310 may include either a time-based query filtering mechanism or a record based filtering mechanism.

For example, in one embodiment, a time-based sub-query is to be executed against the relational data store 155, in which the time-based sub-query specifies the one or more other data elements to be retrieved from the relational data store 155 based one those data elements within the relational data store 155 having a time stamp that is later than any timestamp corresponding to those data elements within the one or more data elements residing within the non-relational data store 150.

In an alternative embodiment, a record identifier based sub-query is to be executed against the relational data store 155, in which the record identifier based sub-query specifies the one or more other data elements to be retrieved from the relational data store 155 based one those data elements within the relational data store 155 having a record identifier that is numerically greater than any record identifier corresponding to those data elements within the one or more data elements residing within the non-relational data store 150.

Figure 4:
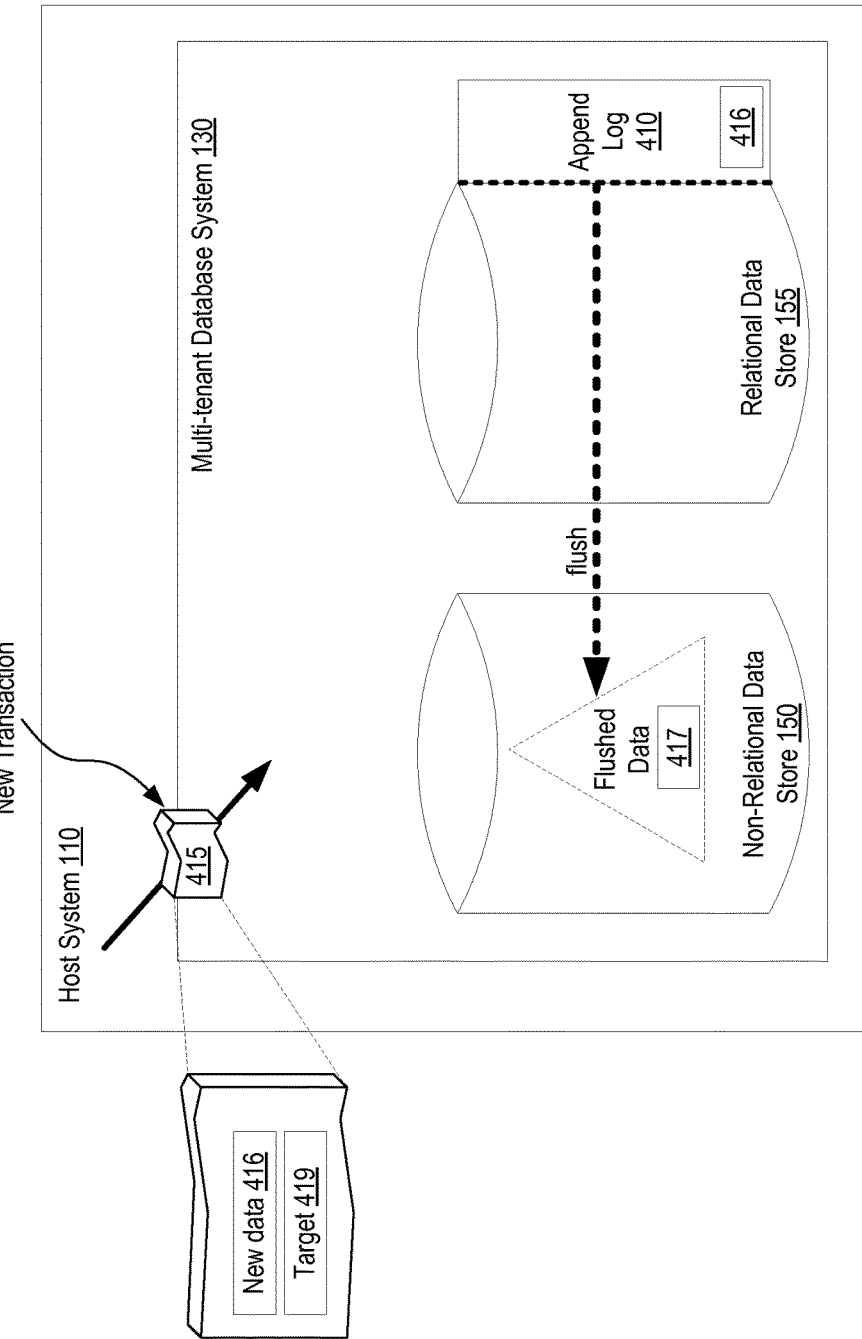
FIG. 4 illustrates an alternative exemplary architecture in which embodiments may operate.

FIG. 4 illustrates an alternative exemplary architecture 400 in which embodiments may operate. In particular, depicted in additional detail is the treatment of new transactions received by the multi-tenant database system 130 in accordance with certain embodiments.

For example, in certain embodiments, new information being written or inserted into the multi-tenant database system 130 for persistent storage may be designated for being presently stored in the non-relational data store 150 long term, but may nevertheless be written to the relational data store 155 temporarily. For example, considerations for writing data to one data store (such as the relational data store 155) on a temporary basis and then later transitioning the data to another data store (such as the non-relational data store 150) may include, for example, improved write response times to one data store versus the other, yet improved retrieval times from the alternate data store. One data store may be associated with lower computational or lower operational costs. A particular data store, such as the non-relational data store 150 may operate more efficiently with data that is rarely updated, but is retrieved often. Alternatively, the other data store, such as the relational data store 155 may exhibit better operational efficiency with greatly fragmented data or data that is very frequently updated or added to, relative to the prior example having data that is rarely updated.

Therefore, in accordance with certain embodiments, new transactions 415 received at the multi-tenant database system 130 (e.g., within a request 115 such as that depicted previously) include or specify new data 416 that is to be written to the non-relational data store 150. In some embodiments, new data 416 is written to an append log 410 of the relational data store 155, despite an indication that the new data 416 is to be written to the non-relational data store 150. Such an indication of where new data 416 is to be written may be specified by the new transaction 415, for example, by a target 419 attribute within the new transaction 415. Alternatively, a determination may be made by the host system 110 based on the characteristics of the new data 416 as determined by, for example, optimizer agent 245, or based on a flag or a stored preference associated with an OrgID that corresponds to the new transaction 415.

In some embodiments, a join operation (e.g., 305) that includes sub-queries to retrieve one or more other data elements residing within the relational data store 155 based on a determined data delta (e.g., 310) includes a sub-query to retrieve the one or more other data elements residing within the relational data store 155 from the append log 410 of the relational data store 155. For example, new data 416 written to the append log may be retrieved, or elements of new data 416 stored in append log may be retrieved.

In one embodiment, host system 110 triggers a flush of the append log 410, thus flushing the new data 416 written to the append log 410 of the relational data store 155 to the non-relational data store 150 when the append log 410 reaches a flush threshold, resulting in, for example, new data then residing in non-relational data store 150 as flushed data 417 and corresponding to new data 416 which previously resided in append log 410 of relational data store 155.

Different types of data may be stored by multi-tenant database system 130. For example, in one embodiment, the one or more data elements residing within the non-relational data store 150 correspond to plurality of compressed flat files or a plurality of binary files or a combination of compressed flat files and binary files. Such files may be more efficiently stored via a non-relational database architecture (e.g., 150).

In another embodiment, relational data store 155 implements a relational database in accordance with a relational database management system (RDBMS), in which a plurality of relation tables of the relational database are interrelated to each other through one or more overlapping common characteristics for each of two or more relation tables within the relational database, thus forming the "relationships" which are commonly associated with relational type data stores 155.

In one embodiment, the non-relational data store 150 implements a distributed structured database having a plurality of underlying hardware storage devices, each providing at least a portion of a total storage capacity for the non-relational data store 150. In such an embodiment, data elements within the non-relational data store 150 are referenceable on the basis of a primary key, but are not referenceable on the basis of one or more overlapping common characteristics between two or more relation tables, such as is the case with data elements within the relational data sore 155.

In one embodiment, the relational data store 155 implements a relational database model selected from among the following: an Oracle compatible database implementation, an IBM DB2 Enterprise Server compatible relational database implementation, a MySQL compatible relational database implementation, and a Microsoft SQL Server compatible relational database implementation.

In one embodiment, the non-relational data store 150 implements a NoSQL non-relational database implementation selected from among the following: a Vampire compatible non-relational database implementation, an Apache Cassandra compatible non-relational database implementation, a BigTable compatible non-relational database implementation, and an HBase compatible non-relational database implementation.

In one embodiment, the non-relational data store 150 includes a plurality of distributed computing nodes, each computing node comprising at least a memory, one or more processors, and one or more communicatively interfaced hard disk drives. In such an embodiment, each of the distributed computing nodes may further include an isolated non-relational database instance having functionality to read, write, and update non-relational database transactions without authorization or control from a centralized transaction authority.

In a particular embodiment, the relational data store 155 implements a monolithic relational database instance comprising memory and processors that coordinate computing resources with a centralized transaction authority that controls whether updates or changes to the monolithic relational database instance are committed to persistent storage upon persistent storage devices communicatively interfaced to, and controlled by, the monolithic relational database instance.

Figure 5:
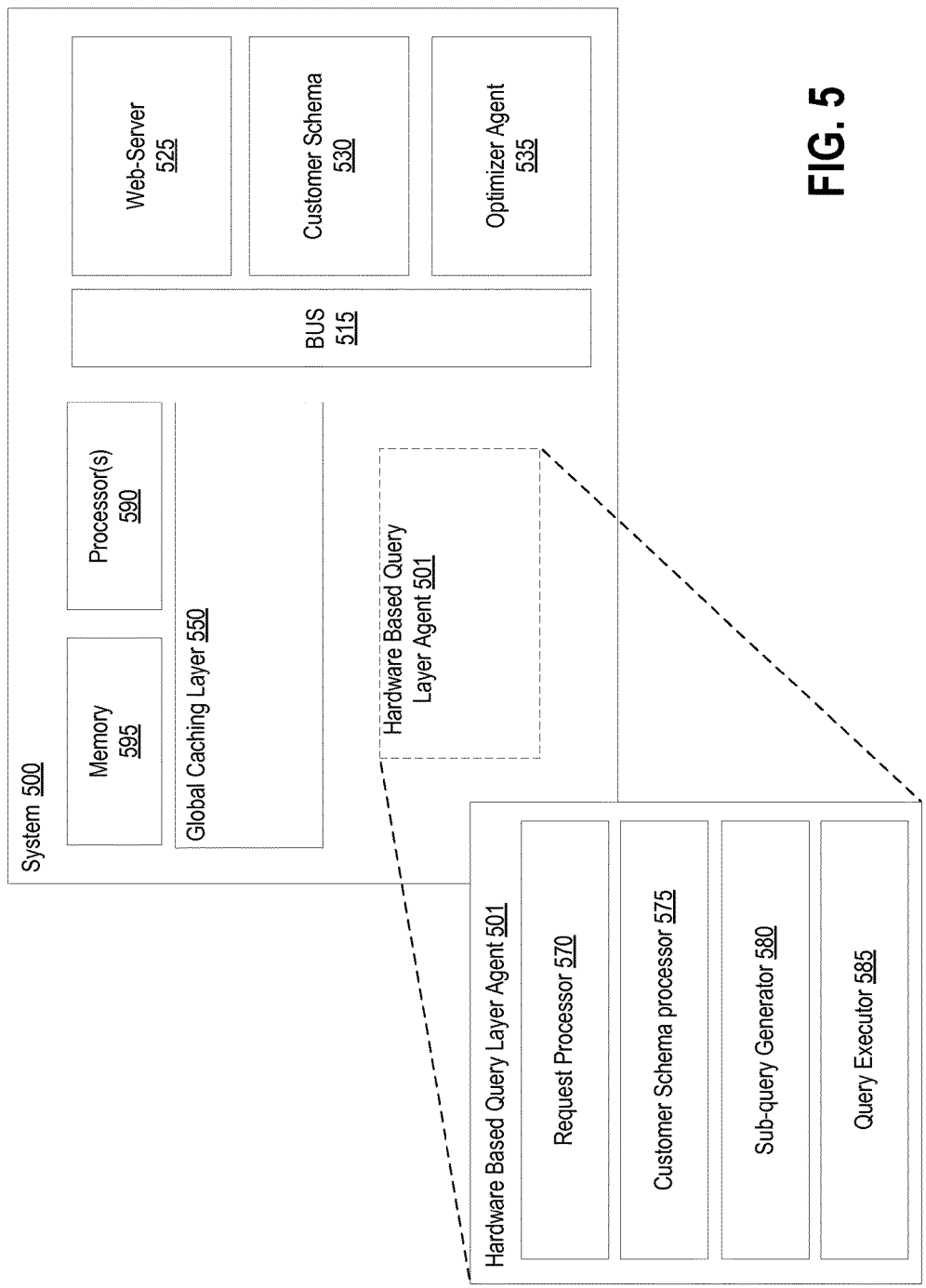
FIG. 5 shows a diagrammatic representation of a system in which embodiments may operate, be installed, integrated, or configured.

FIG. 5 shows a diagrammatic representation of a system 500 in which embodiments may operate, be installed, integrated, or configured.

In one embodiment, system 500 includes a memory 595 and a processor or processors 590. For example, memory 595 may store instructions to be executed and processor(s) 590 may execute such instructions. System 500 includes bus 515 to transfer transactions and data within system 500 among a plurality of peripheral devices communicably interfaced with bus 515. System 500 further includes web-server 525, for example, to receive requests, return responses, and otherwise interface with remote clients, such as client devices located within customer organizations 105A-C.

System 500 is further depicted as having an optimizer agent 535 designed to optimize database queries and database sub-queries and optionally coordinate pre-queries to determine an optimal or a preferred approach to query the underlying data stores. System 500 further includes a global caching layer 550 to provide caching services to communicably interfaced devices and systems and in particular, provide caching of customer schema data (e.g., meta data, etc.). The customer schema data is provided by customer schema 530 operable in conjunction with the global caching layer 550 specifying, for example, whether requisite data elements are stored by a relational database or a non-relational database implementation within the multi-tenant database system or both, and specifying locations within the underlying data stores for one or more data elements that make up a dataset for a corresponding request. The customer schema 530 may be stored upon a hard drive, persistent data store or other storage location within system 500.

Distinct within system 500 is hardware based Query Layer Agent 501 which includes request processor 570, customer schema processor 575, sub-query generator 580, and query executor 585. In accordance with one embodiment, request processor 570 receives requests specifying data to be retrieved (e.g. from web-server 525, from host system 110 as previously described, or directly from a connected network interface). Request processor 570 coordinates with customer schema processor 575 to retrieve the one or more locations of the requested data that is to be retrieved from the underlying data stores. Request processor 570 further coordinates with sub-query processor 580 to develop and generate the necessary sub-queries to either retrieve the requested one or more data elements from the appropriate underlying data stores based on the determined one or more locations of such data, or generates the necessary sub-queries to initiate join operations causing data subsets to be synchronized, flushed, or replicated from one data store to another, so that subsequent sub-queries can retrieve an entire requested data set from a lone data store. Such sub-queries generated by the sub-query generator 580 may rely upon statistics and pre-query results available from the optimizer agent 535. Query executor 585 executes the generated query and sub-queries against a communicably interfaced database implementation.

FIG. 6 is a flow diagram illustrating a method 600 for performing cross store joins in a multi-tenant store in accordance with one embodiment, including specifying and performing join operations specified by a database query (e.g., 217) in accordance with certain embodiments. Method 600 may be performed by processing logic that may include hardware (e.g., circuitry, dedicated logic, programmable logic, microcode, etc.), software (e.g., instructions run on a processing device to perform various query operations such reading, writing, updating, optimizing, initiating pre-queries, developing sub-queries, etc., or a combination thereof.

In one embodiment, method 600 is performed by hardware logic, such as the hardware based query layer agent depicted at element 501 of FIG. 5. Some of the blocks and/or operations listed below are optional in accordance with certain embodiments. The numbering of the blocks presented is for the sake of clarity and is not intended to prescribe an order of operations in which the various blocks must occur.

Method 600 begins with processing logic receiving a request at a host system for the multi-tenant database system, the request specifying data to be retrieved from the multi-tenant database system (block 605). At block 610, processing logic retrieves, based on the request via the host system, one or more locations of the data to be retrieved.

At block 615, processing logic retrieves, via the host system, a customer schema responsive to receiving the request. For example, a customer schema may describe the one or more locations of data to be retrieved, the customer schema specifying each of the plurality of data elements of the data as residing within either the non-relational data store or residing within the relational data store, or as being available from both the non-relational data store and the relational data store.

At block 620, processing logic generates, at the host system, a database query based on the request. For example, the database query may specify a plurality of data elements to be retrieved, the plurality of data elements including one or more data elements residing within the non-relational data store and one or more other data elements residing within the relational data store. The database query may further include a plurality of sub-queries. In one embodiment, the database query specifies a join operation via one of the sub-queries. A purge, flush, synchronization, or replication operation may similarly be specified via a sub-query.

At block 625, processing logic executes the database query against the multi-tenant database system to retrieve the data.

At block 630, processing logic receives new transactions at the multi-tenant database system, each new transaction specifying new data to be written to the non-relational data store and at block 635, processing logic writes the new data to an append log of the relational data store. For example, in one embodiment, a sub-query of the database query specifies that the data to be retrieved is to be retrieved from the append log of the relational data store.

At block 640, processing logic flushes the new data written to the append log of the relational data store to the non-relational data store when the append log reaches a flush threshold.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent multi-tenant data base implementations), which communicate with each other via a bus 730. Main memory 704 includes customer schema 724 (e.g., specifies one or more locations of data or data elements constituting a specified data or data set among two or more diverse data stores, such as locations of data elements spread across both a relational data store and a non-relational data store and retrievable via, for example, hardware based query layer agent 734). Main memory 704 further includes global cache layer 723, such as a system-wide accessible global caching layer to provide meta-data and other association or correspondence information between multiple data elements of a larger data set, such as the type of information provided via customer schema 724. Main memory 704 and its sub-elements (e.g. 723 and 724) are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc. The computer system 700 may further include a Hardware based query layer agent 734 managing database queries and sub-queries and coordinating transactions with an underlying data store, such as a multi-tenant database system.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system, comprising:
a memory to store instructions;
a processor to execute the instructions stored in the memory;
a communications interface to a database system, wherein the database system operates both a relational data store and a non-relational data store;
a request processor to receive a database transaction at the system for the database system, the database transaction including new data for persistent storage within the database system;
an optimizer agent to analyze the database transaction and determine the new data is designated for persistent storage within the non-relational data store of the database system and wherein the optimizer agent is to write the new data to an append log of the relational data store without writing the new data to the non-relational data store despite an indication the new data is designated for persistent storage within the non-relational data store;
the request processor to receive a request for data retrieval from the database system, including retrieval of data stored within the non-relational data store and at least a portion of the new data written to the append log of the relational data store;
the request processor to retrieve the data stored within the non-relational data store from the non-relational data store and to further retrieve the portion of the new data from the append log of the relational data store; and
the request processor to send a response to an originator of the request in fulfillment of the request.

2. The system of claim 1:
wherein the database system is to flush the new data previously written to the append log of the relational data store to the non-relational data store via a write transaction of the new data to the non-relational data store in fulfillment of the designation of the new data for persistent storage within the non-relational data store of the database system.

3. The system of claim 2:
wherein the request processor is to receive a second request for at least a portion of the new data; and
wherein the request processor is to retrieve the portion of the new data from the non-relational data store of the database system.

4. The system of claim 1:
wherein the request processor is to further perform a join operation to combine the data retrieved from the non-relational data store and the portion of the new data retrieved from the append log of the relational data store into a joined dataset; and
wherein the request processor to send the response to the originator of the request comprises the request processor to return the joined dataset to the originator of the request in fulfillment of the request.

5. The system of claim 1, further comprising:
a customer schema processor to determine one or more locations of the data and the new data requested for retrieval based on the request received by the request processor.

6. The system of claim 5:
a sub-query generator to generate multiple database sub-queries based on the one or more locations determined, wherein the generated multiple database sub-queries specify a plurality of data elements for retrieval, the plurality of data elements including at least the portion of the new data residing within the append log of the relational data store prior to a flush of the append log having the new data stored therein and at least the data residing within the non-relational data store.

7. The system of claim 1:
a sub-query generator to generate multiple database sub-queries, including each of:
a first sub-query to the append log of the relational data store having the new data written thereto;
a second sub-query to the non-relational data store having the data stored therein;
a third sub-query to join the portion of the new data retrieved from the append log of the relational data store with the data retrieved from the non-relational data store into a joined data set; and
a query executor to execute the multiple database sub-queries against the database system to retrieve the data requested.

8. The system of claim 1, further comprising:
a global caching layer communicably interfaced with the memory to provide caching services for the system; and
wherein the request processor is to further perform an in-memory join operation to combine the data retrieved from the non-relational data store and the portion of the new data retrieved from the append log of the relational data store into a joined dataset within the global caching layer; and
wherein the request processor to send the response to the originator of the request comprises the request processor to return the joined dataset to the originator of the request from the global caching layer.

9. The system of claim 1:
wherein the optimizer agent to write the new data to the append log of the relational data store comprises the optimizer agent to temporarily write the new data to the append log of the relational data store without writing the new data to the non-relational data store to realize lower computational costs or lower operational costs associated with writing the new data to the relational data store; and
wherein the database system is to subsequently flush the new data temporarily written to the append log of the relational data store to the non-relational data store for long term storage via a write transaction of the new data to the non-relational data store.

10. The system of claim 1:
wherein the optimizer agent to write the new data to the append log of the relational data store comprises the optimizer agent to temporarily write the new data to the append log of the relational data store without writing the new data to the non-relational data store to improve a write response time associated with the database transaction; and
wherein the database system is to subsequently flush the new data temporarily written to the append log of the relational data store to the non-relational data store for long term storage via a write transaction of the new data to the non-relational data store.

11. The system of claim 10, wherein the subsequent database flush of the new data to the non-relational data store upon the append log of the relational database reaching a flush threshold.

12. The system of claim 10, wherein the subsequent database flush of the new data to the non-relational data store is triggered by the system causing the database system to flush the new data to the non-relational data store.

13. The system of claim 1:
wherein system operates within a host organization which provides cloud computing services; and
wherein the database system comprises a multi-tenant database system operating within the host organization, the multi-tenant database system having embodied therein elements of hardware and software that are shared by a plurality of separate and distinct customer organizations, each of the separate and distinct customer organizations being remotely located from the host organization having the multi-tenant database system executing therein.

14. The system of claim 1, wherein the optimizer agent determines the new data is designated for persistent storage within the non-relational data store of the database system based on a target attribute specified by the database transaction requesting persistent storage of the new data within the non-relational data store.

15. The system of claim 1, wherein the optimizer agent determines the new data is designated for persistent storage within the non-relational data store of the database system based on a flag or a stored preference associated with an OrgID corresponding to the database transaction including the new data.

16. The system of claim 1, wherein the optimizer agent determines the new data is designated for persistent storage within the non-relational data store of the database system based on characteristics of the new data as determined by an optimizer agent of the system.

17. The system of claim 1, wherein the new data comprises a plurality of compressed flat files or a plurality of binary files or a combination of the compressed flat files and the binary files.

18. The system of claim 1:
wherein the relational data store comprises a relational database implemented in accordance with a relational database management system (RDBMS), wherein a plurality of relation tables of the relational database are inter-related to each other through one or more overlapping common characteristics for each of two or more relation tables within the relational database; and wherein the non-relational data store comprises a distributed structured database having a plurality of underlying hardware storage devices, each providing at least a portion of a total storage capacity for the non-relational data store, and wherein data elements within the non-relational data store are referenceable on the basis of a primary key and not on the basis of one or more overlapping common characteristics between two or more relation tables.

19. The system of claim 1:
wherein the relational data store comprises a relational database implementation selected from the group comprising: an Oracle compatible database implementation, an IBM DB2 Enterprise Server compatible relational database implementation, a MySQL compatible relational database implementation, and a Microsoft SQL Server compatible relational database implementation; and
wherein the non-relational data store comprises a NoSQL non-relational database implementation selected from the group comprising a Vampire compatible non-relational database implementation, an Apache Cassandra compatible non-relational database implementation, a BigTable compatible non-relational database implementation, and an HBase compatible non-relational database implementation.

20. The system of claim 1:
wherein the non-relational data store comprises a plurality of distributed computing nodes, each computing node comprising at least a memory, one or more processors, and one or more communicatively interfaced hard disk drives, and wherein each of the distributed computing nodes comprise an isolated non-relational database instance having functionality to read, write, and update non-relational database transactions without authorization or control from a centralized transaction authority; and
wherein the relational data store comprises a monolithic relational database instance comprising memory and processors that coordinate computing resources with a centralized transaction authority that controls whether updates or changes to the monolithic relational database instance are committed to persistent storage upon persistent storage devices communicatively interfaced to, and controlled by, the monolithic relational database instance.

21. A method performed by a system having a memory to store instructions and a processor to execute the instructions stored in the memory, wherein the method comprises:
interfacing the system to a database system via a communications interface, wherein the database system operates both a relational data store and a non-relational data store;
receiving, via a request processor, a database transaction at the system for the database system, the database transaction including new data for persistent storage within the database system;
determining, via an optimizer agent, the database transaction the new data is designated for persistent storage within the non-relational data store of the database system and writing the new data to an append log of the relational data store without writing the new data to the non-relational data store despite an indication the new data is designated for persistent storage within the non-relational data store;
receiving, via the request processor, a request for data retrieval from the database system, including retrieval of data stored within the non-relational data store and at least a portion of the new data written to the append log of the relational data store;
retrieving, via the request processor, the data stored within the non-relational data store from the non-relational data store and further retrieving the portion of the new data from the append log of the relational data store; and
sending, via the request processor, a response to an originator of the request in fulfillment of the request.

22. The method of claim 21, further comprising:
flushing the new data previously written to the append log of the relational data store to the non-relational data store via a write transaction of the new data to the non-relational data store in fulfillment of the designation of the new data for persistent storage within the non-relational data store of the database system.

23. Non-transitory computer readable storage media having instructions stored thereupon that, when executed by a processor of a system, the instructions cause the system to perform operations including:
interfacing the system to a database system via a communications interface, wherein the database system operates both a relational data store and a non-relational data store;
receiving a database transaction at the system for the database system, the database transaction including new data for persistent storage within the database system;
determining the database transaction the new data is designated for persistent storage within the non-relational data store of the database system and writing the new data to an append log of the relational data store without writing the new data to the non-relational data store despite an indication the new data is designated for persistent storage within the non-relational data store;
receiving a request for data retrieval from the database system, including retrieval of data stored within the non-relational data store and at least a portion of the new data written to the append log of the relational data store;
retrieving the data stored within the non-relational data store from the non-relational data store and further retrieving the portion of the new data from the append log of the relational data store; and
sending a response to an originator of the request in fulfillment of the request.

* * * * *